United States Patent
Choi et al.

(10) Patent No.: US 8,025,444 B2
(45) Date of Patent: Sep. 27, 2011

(54) OPTICAL MODULE AND FABRICATION METHOD OF THE SAME

(75) Inventors: Jun Seok Choi, Gwangju (KR); Hyung Jong Lee, Gwangju (KR)

(73) Assignee: Kyoung Hie Chung, Gwangju (KR)

( * ) Notice: Subject to any disclaimer, the term of this patent is extended or adjusted under 35 U.S.C. 154(b) by 999 days.

(21) Appl. No.: 11/816,349

(22) PCT Filed: May 25, 2007

(86) PCT No.: PCT/KR2007/002544

§ 371 (c)(1),
(2), (4) Date: Aug. 15, 2007

(87) PCT Pub. No.: WO2007/139316

PCT Pub. Date: Dec. 6, 2007

(65) Prior Publication Data

US 2010/0135619 A1   Jun. 3, 2010

(30) Foreign Application Priority Data

May 25, 2006   (KR) .................. 2006-0047195

(51) Int. Cl.
*G02B 6/36* (2006.01)
*G02B 6/12* (2006.01)
(52) U.S. Cl. ............................ 385/88; 385/14
(58) Field of Classification Search ............ 385/88, 385/14
See application file for complete search history.

(56) References Cited

U.S. PATENT DOCUMENTS

| | | | | |
|---|---|---|---|---|
| 6,061,481 A * | 5/2000 | Heidrich et al. | ............... | 385/14 |
| 6,445,857 B1 * | 9/2002 | Korenaga et al. | ............... | 385/52 |
| 6,542,671 B1 * | 4/2003 | Ma et al. | ............... | 385/47 |
| 6,647,184 B2 * | 11/2003 | Ukechi et al. | ............... | 385/47 |
| 6,798,941 B2 * | 9/2004 | Smith et al. | ............... | 385/18 |
| 6,853,776 B2 | 2/2005 | Kimura | | |
| 7,031,575 B2 | 4/2006 | Blauvelt et al. | | |
| 7,574,081 B2 * | 8/2009 | Miyadera et al. | ............... | 385/28 |
| 2002/0097963 A1 * | 7/2002 | Ukechi et al. | ............... | 385/50 |
| 2002/0176662 A1 * | 11/2002 | Melchior et al. | ............... | 385/31 |
| 2003/0113067 A1 * | 6/2003 | Koh et al. | ............... | 385/48 |
| 2003/0123827 A1 * | 7/2003 | Salerno et al. | ............... | 385/129 |
| 2003/0185532 A1 * | 10/2003 | Hosomi et al. | ............... | 385/129 |
| 2005/0259910 A1 * | 11/2005 | Li et al. | ............... | 385/14 |
| 2007/0110363 A1 * | 5/2007 | Miyadera et al. | ............... | 385/27 |
| 2008/0095663 A1 * | 4/2008 | Dutta et al. | ............... | 422/55 |

FOREIGN PATENT DOCUMENTS

| | | |
|---|---|---|
| JP | 01118806 A | 5/1989 |
| JP | 2002182051 A | 6/2002 |
| JP | 2003207662 A | 7/2003 |

OTHER PUBLICATIONS

Park, et al.; "3 TO-Triplexer Optical Sub-Assembly Development for TO Based Triplexer Optical Sub-Assembly"; Photonics Conference; 2004; 3 pages; paper No. T1A2; Sansung Electronics; Optical Society of Korea. (Partial English-language translation attached).

* cited by examiner

*Primary Examiner* — K. Cyrus Kianni
(74) *Attorney, Agent, or Firm* — The Webb Law Firm

(57) ABSTRACT

Disclosed is an optical module comprising, an optical waveguide on the upper side of a substrate; a cutout with at least two slant surfaces, passing at least the core of the optical waveguide; and a film-filter above the cutout. Constructions of bi-directional multi-wavelength optical transmitter-receiver assembly using the optical module as a unit element are also provided in variety on a planar substrate. According to this invention, a bi-directional multi-wavelength transmitter-receiver, which is compact, reliable, excellent in the optical performance and simple in the alignments between the composing elements, can be produced.

8 Claims, 7 Drawing Sheets

[Fig. 1]
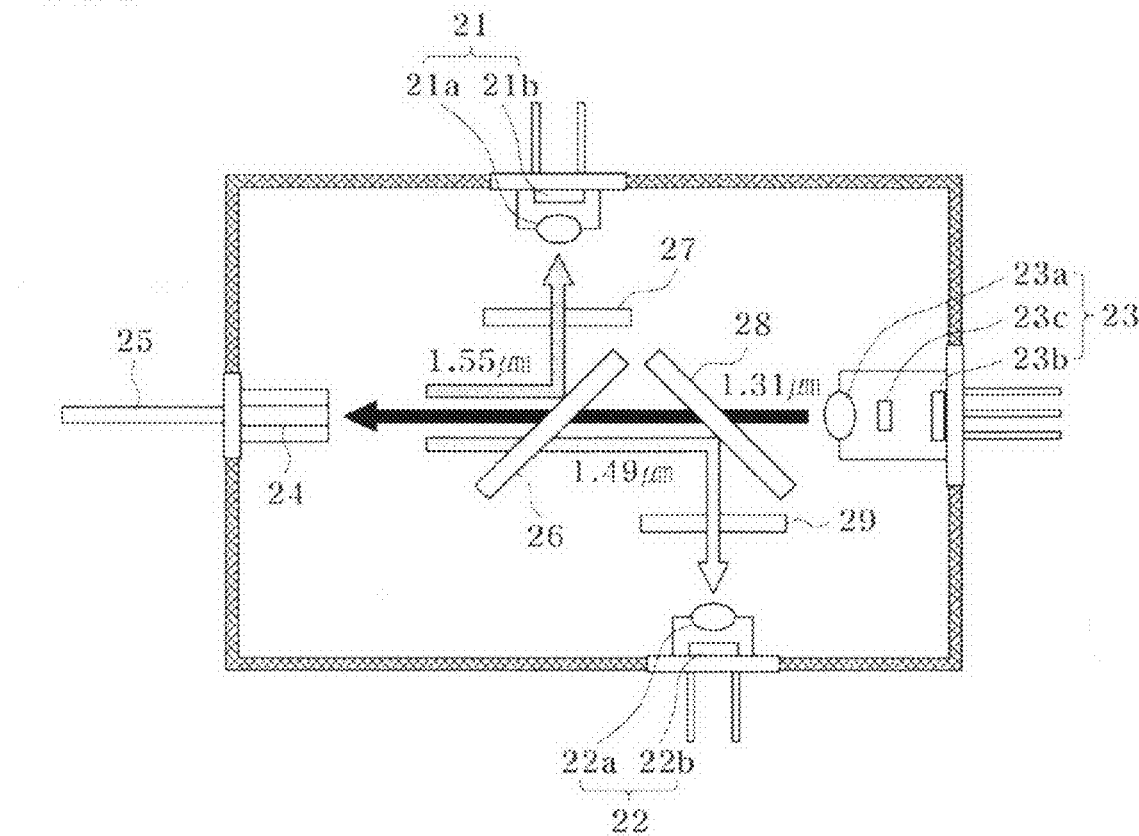
[Fig. 2]
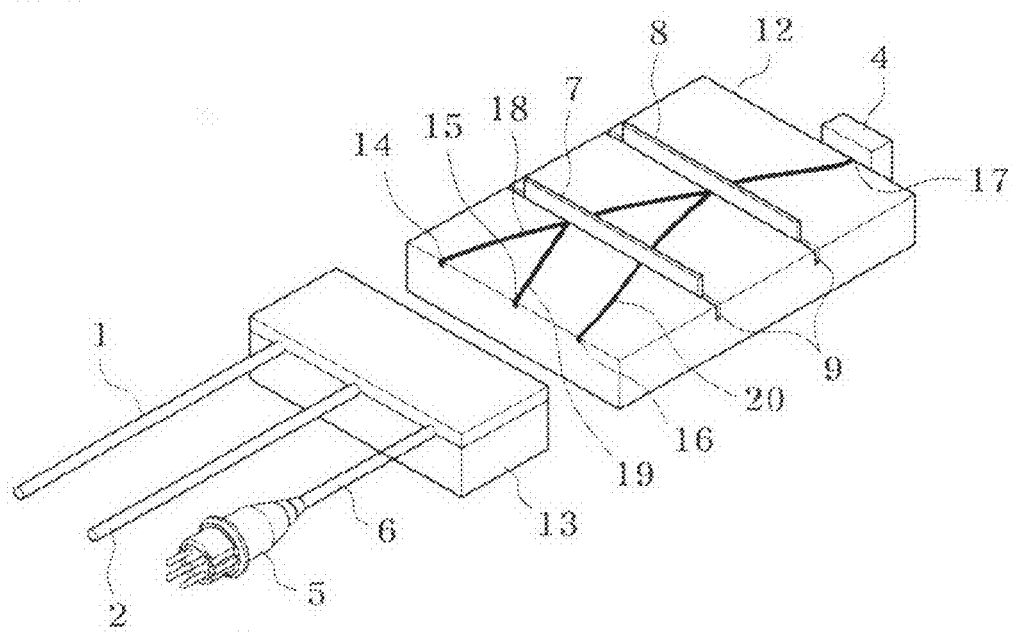

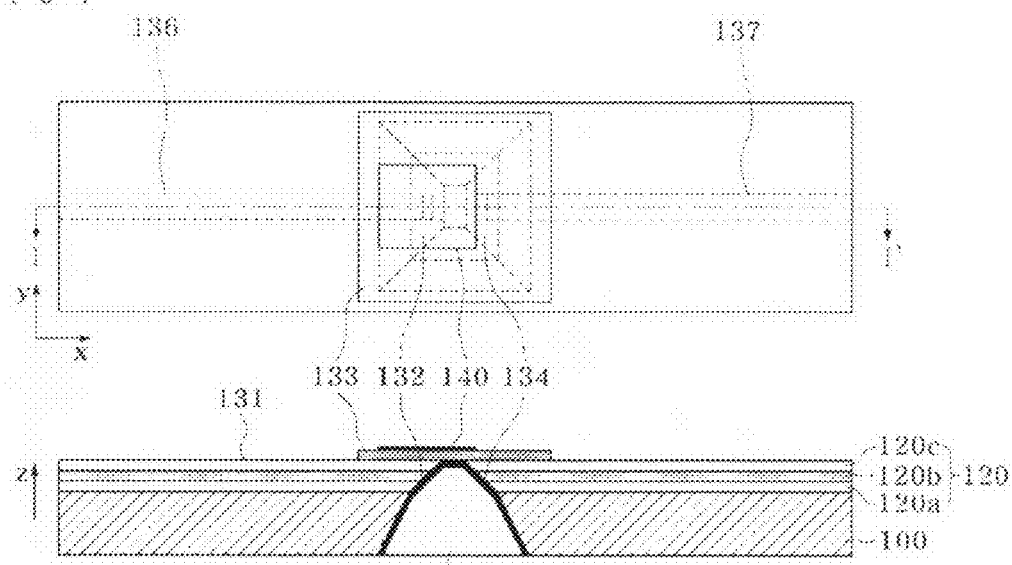
[Fig 3]
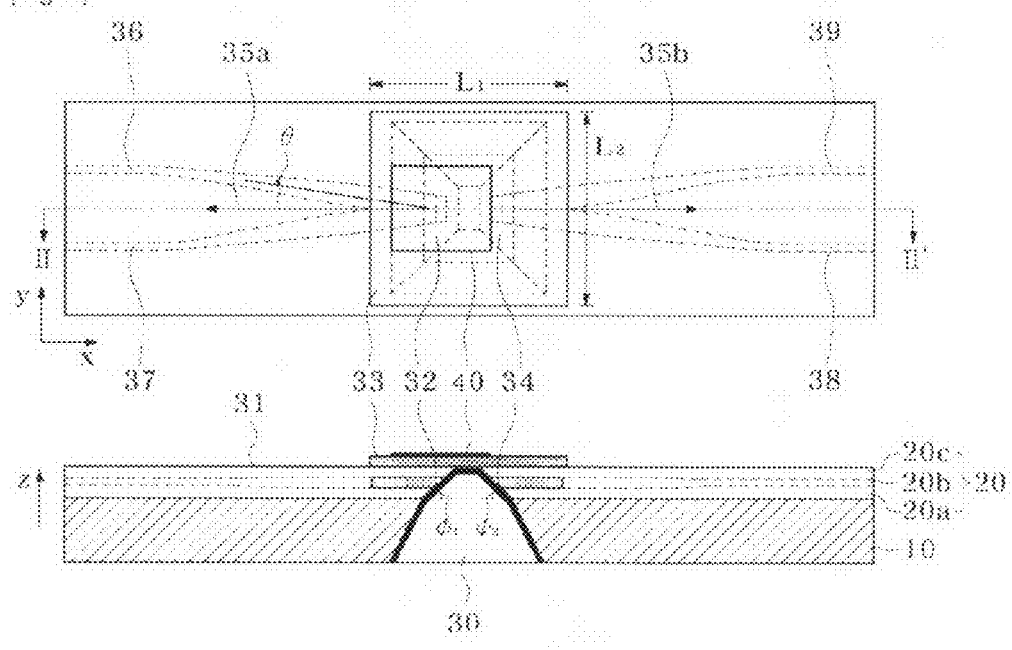
[Fig 4]

[Fig. 5]
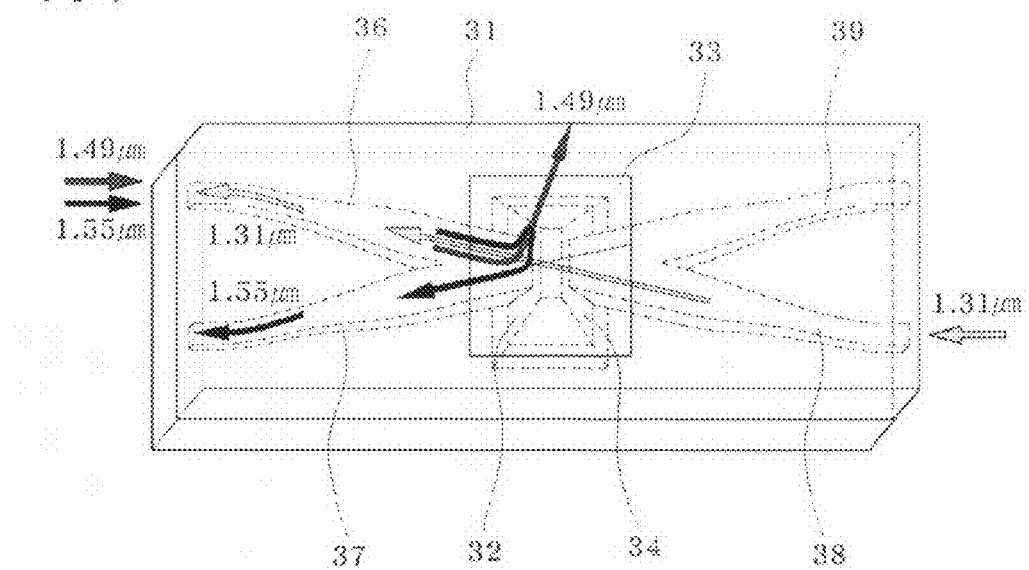
[Fig. 6]
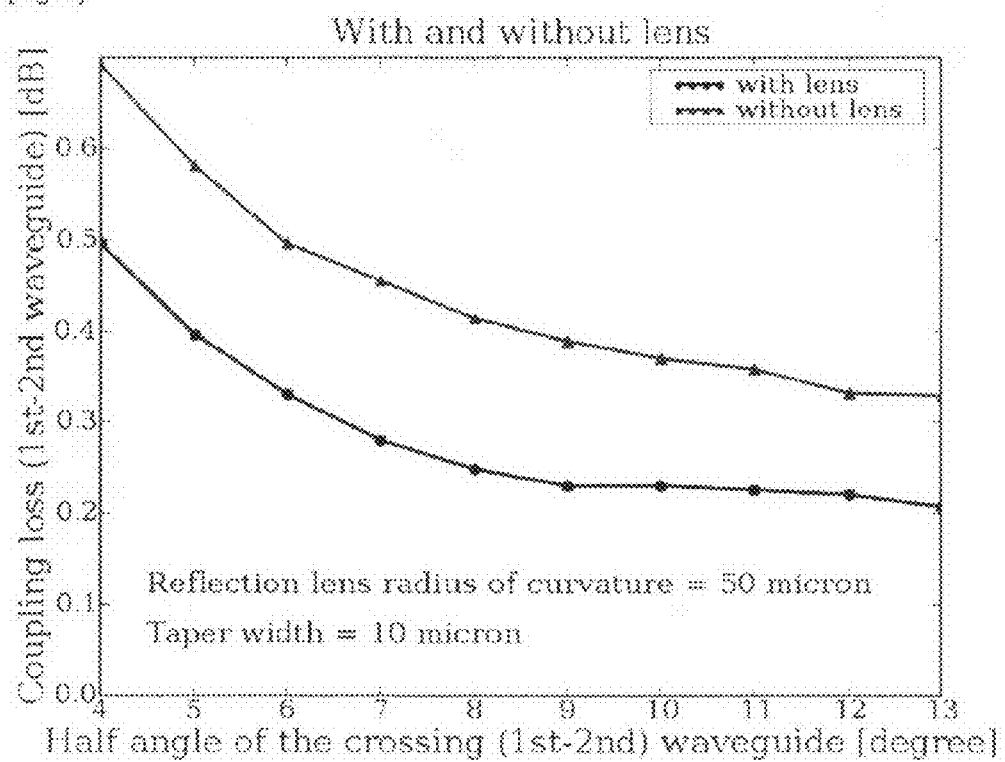

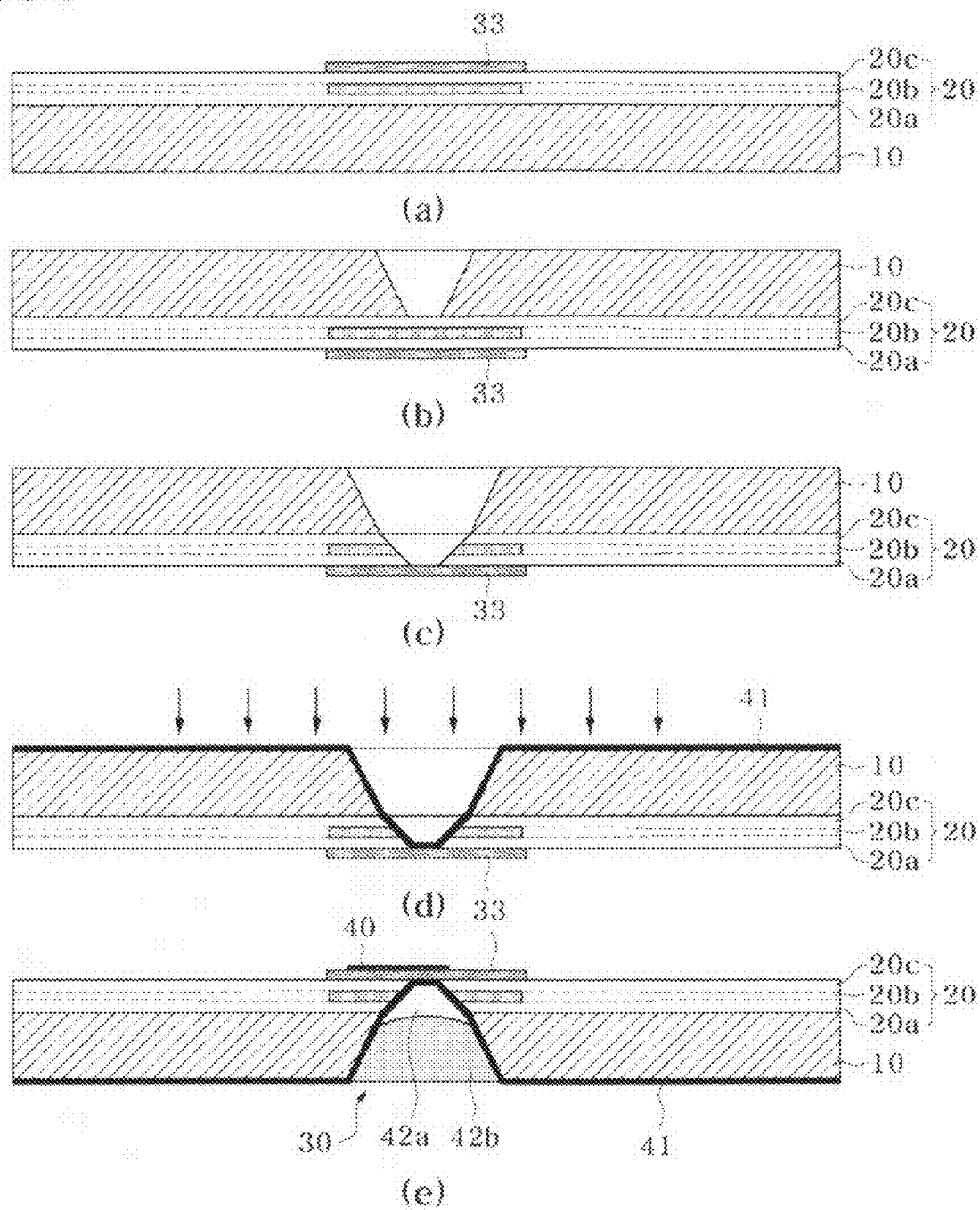

[Fig. 8]
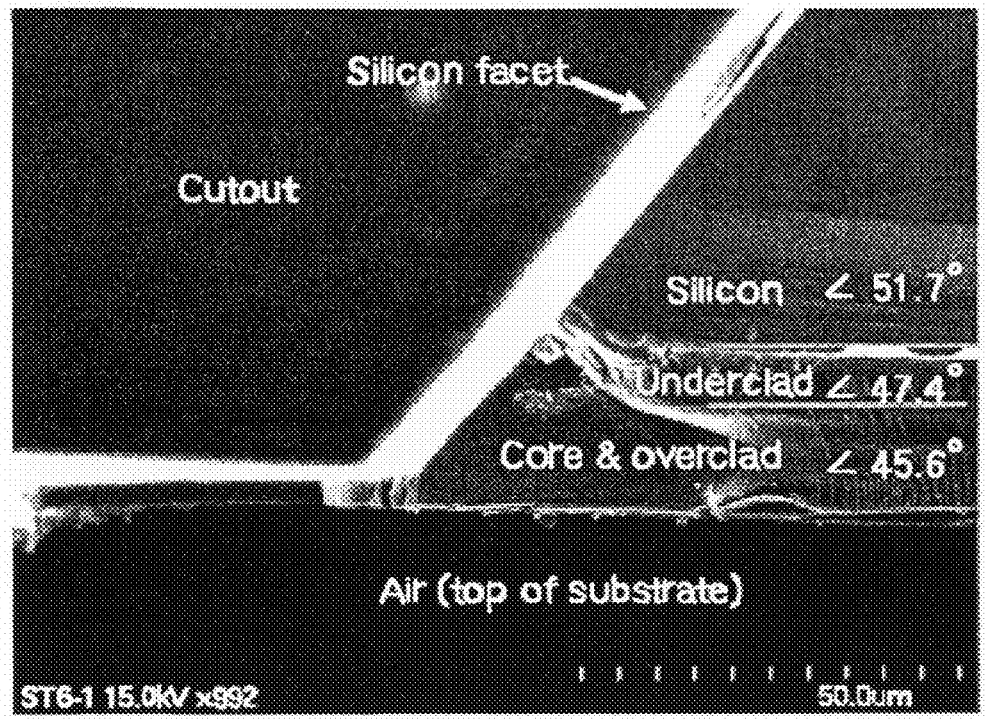
[Fig. 9]
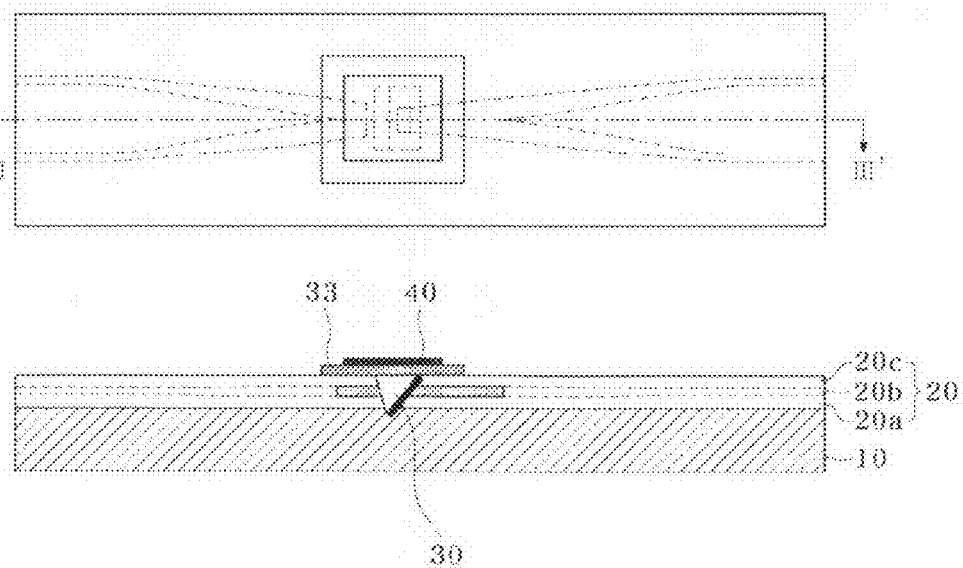

[Fig. 10]
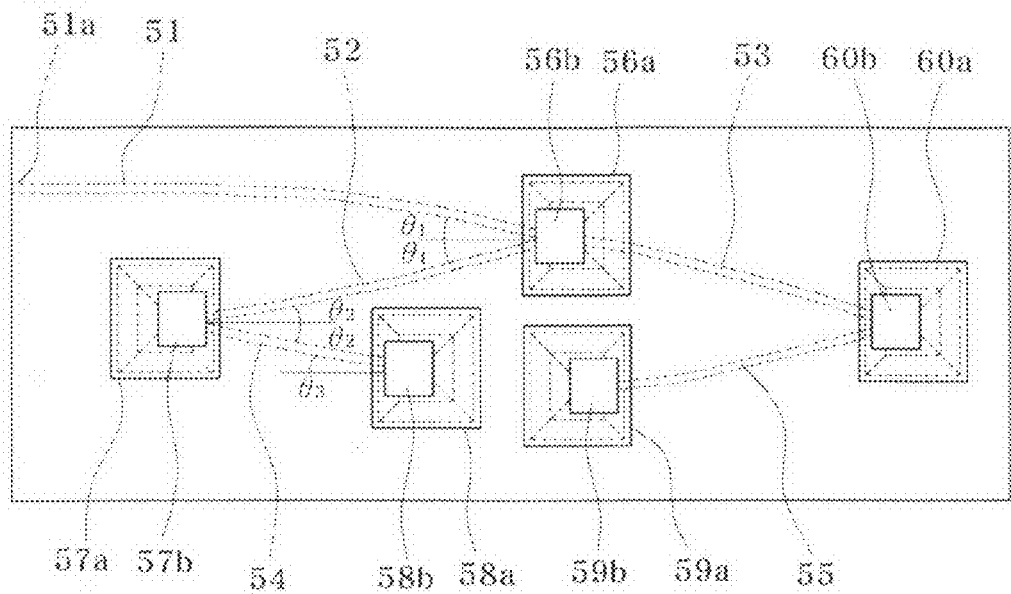
[Fig. 11]
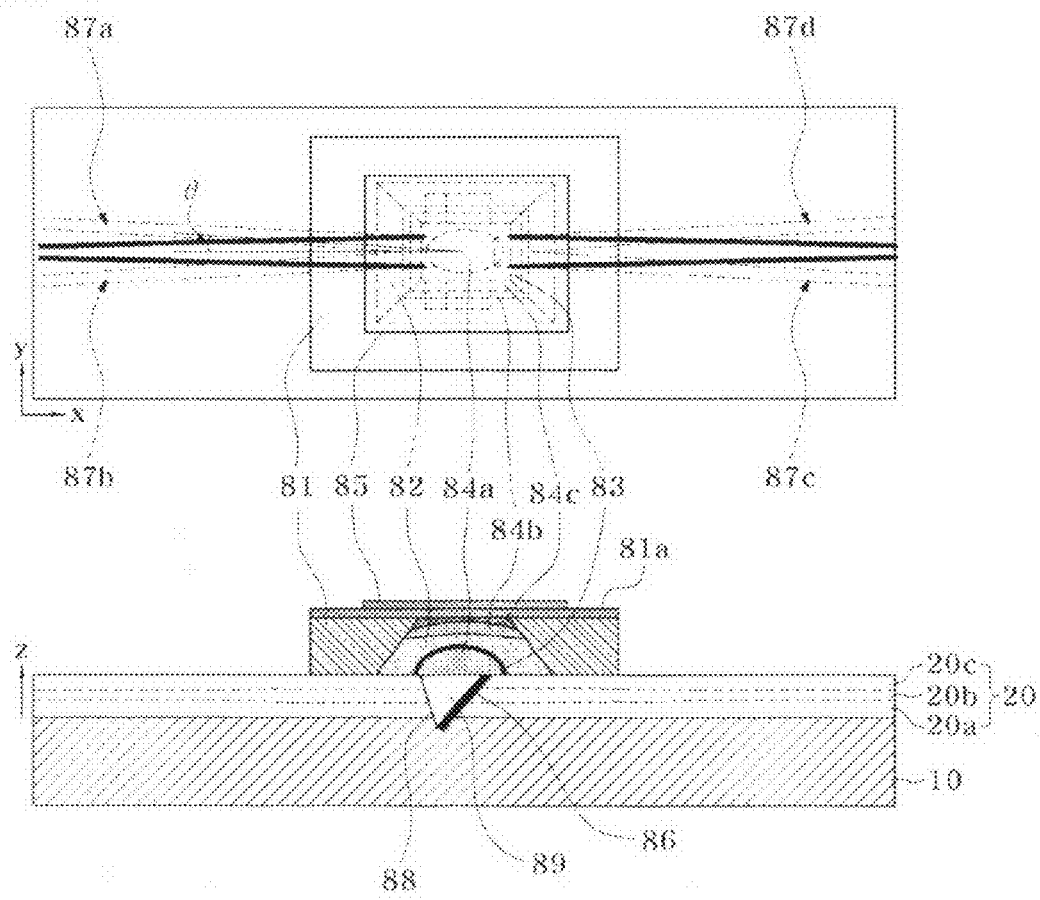

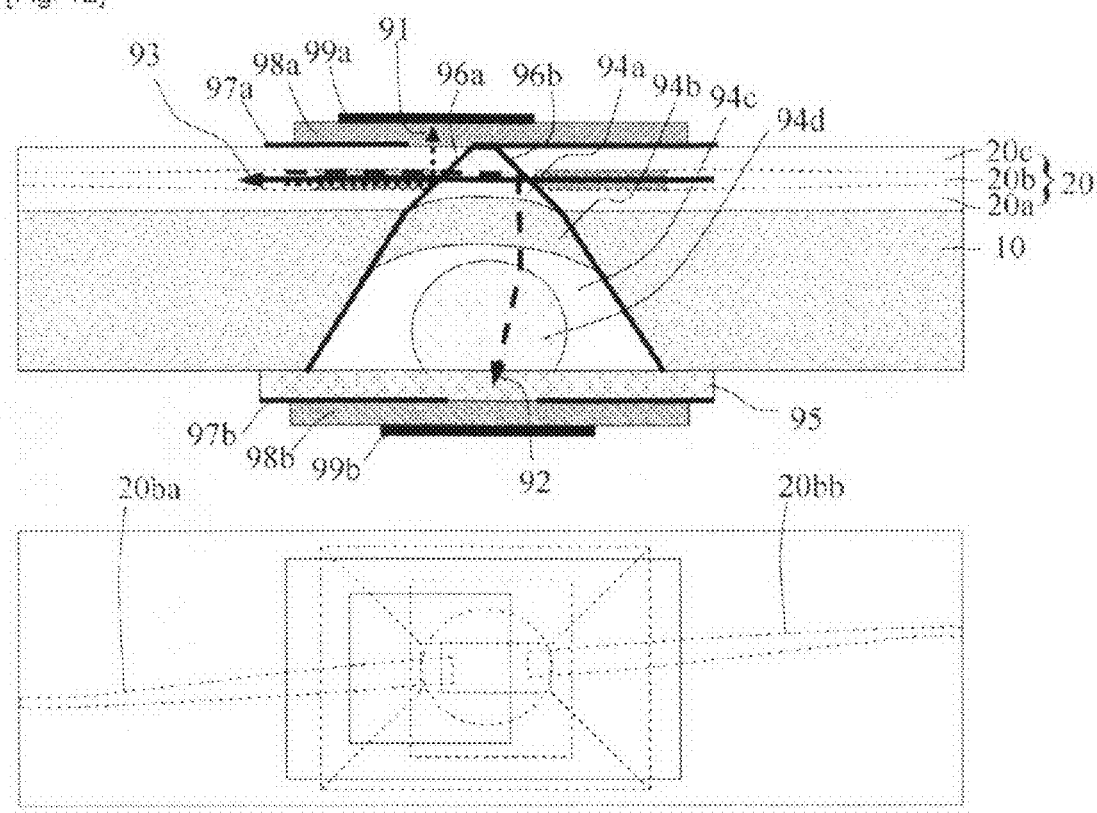

OPTICAL MODULE AND FABRICATION METHOD OF THE SAME

TECHNICAL FIELD

The present invention is related to c and method thereof. The optical module comprises an optical waveguide, at least one slanted surface, and film filters on a planar substrate. Constructions of bi-directional multi-wavelength optical transmitter-receiver assembly using the optical module as a unit element are also provided in variety on a planar substrate. According to this invention, a bi-directional multi-wavelength transmitter-receiver, which is compact, reliable, excellent in the optical performance and simple in the alignments between the composing elements, can be produced.

BACKGROUND ART

Bi-directional optical communication transmits and receives simultaneously optical signals in both directions of a single optical fiber. In each direction, the optical wavelength in use is different, which provides two independent path of communication even if the path is single. Consequently, at the end of an optical fiber, the optical signal of outgoing is to be coupled into the reverse path of incoming signal and two conversions of signals, one from electrical to optical for transmission and the other from optical to electrical for reception, take place. More general form of bi-directional optical communication uses more wavelengths than the two wavelengths in each direction. The wavelengths in each direction then need to be splitted or combined at the termination of optical fiber; and the signals of each optical wavelength is to be converted either from electrical to optical or from optical to electrical.

An example of such a bi-directional device is a BiDi (bi-directional; simply written as BiDi) diplexer for use in the FTTH (Fiber-to-the-Home) network of optical communication, which uses 1.31 μm wavelength for transmission from each subscriber to the central office (upstream signal) and 1.55 μm wavelength for reception at each subscriber (downstream signal) in the network. Here, the 'diplexer' implies two wavelength device. Therefore, the termination of optical fiber at the subscriber is to be connected by the optical device of 1.31 μm transmission together with 1.55 μm reception into a single optical fiber to the central office.

On the other hand, an extra wavelength, in addition to the two wavelength of the diplexer, is used to send a signal such as CATV (Cable TV) to each subscriber, which is referred to a BiDi-triplexer or, simply, a triplexer. In this case, downstream digital signal uses 1.49 μm wavelength; upstream digital signal uses 131 μm wavelength; and downstream analog signal uses 1.55 μm wavelength. Furthermore, the fourth wavelength of 1.61 μm for further expansion is considered by some service providers.

As the number of wavelength channel in use increases in this manner, the number of optical components in use increases and the optical alignments in the assembly of the components becomes a critical issue in the production of device. For example, the core of a common optical fiber is about 10 μm and the tolerance of less than a micron in the optical alignment is necessary in the procedure of optical alignment fixing an optical fiber and the optical devices in use (transmitter or receiver; normally laser diode or photodiode).

In case of BiDi triplexer, for example, the optical alignment using the former technology has about 50 freedoms to fix in the alignment; and consequently one assembly of the device takes more than 10 minutes resulting in a serious bottleneck of production.

FIG. 1 shows the structure of a conventional BiDi-triplexer using former optical-filter technology. Such procedure is illustrated in the "Development of 3 TO-Triplexer Optical Sub-Assembly" (Photonics Conference 2004, paper number T1A2, Optical Society of Korea, Jungwan Park, et. al., Samsung Electronics).

Referring to FIG. 1, BiDi triplexer is composed of three TO-CAN's (Transistor Outline Can; 21, 22, 23) of one laser-diode and two photodiodes and four optical thin film filters 26,27,28,29. Transmitter TO-CAN 23 is pre-assembled with laser diode 23c, lens 23a, and monitor photodiode 23b; and receiver TO-CAN's 21,22 are pre-assembled each with photodiodes 21b,22b and lenses 21a,22a. The lenses 21a,22a, 23a in front of each TO-CAN 21,22,23 and the lens 24 terminating the optical fiber 25 ensure collimated passage of light beam between these components 21,22,23,25.

Explaining the operation of the device, the receiving signals of 1.55 μm and 1.49 μm wavelength coming from the optical fiber 25 are divided by the film-filter 26,27,28,29 in free space, then reaching the receiver photodiodes 21,22. The transmitting signal of 1.31 μm wavelength coming from the laser diode 23 passes through the two consecutive filters 28,26 then reaching the optical fiber 25. In front of two photo-diodes 21,22, the blocking filter of 1.55 μm or 1.49 μm wavelength 27,29 which cuts off the other wavelength than the one of the corresponding photodiode is arranged.

The triplexer using the conventional technology introduces heavy task in the optical alignment. To solve the problem, a method of using a planar optical waveguide instead of using many individual components was introduced. According to this method, the optical alignments between components can be minimized; and components such as film-filters, transmitter, and receivers, can be assembled on a single chip. This method reduces significantly the number of freedom to fix in the optical alignment because optical waveguide can connect signals between the constituent components.

FIG. 2 shows the structure of triplexer using a conventional technology of optical waveguide, which is released in Japan laid-open JP 1998142459, ('Waveguide type optical module', Kyocera corp). Referring to the FIG. 2, the light signal launched through the input port 14 from the optical fiber 1 passes through the optical waveguide 18 entering the film-filters 7,8 in the groove 9, where the signals combine or split the wavelengths by passing or reflecting according to the wavelengths. The signal of 1.3 μm wavelength coming from the optical transmitter 5 is reflected by the film-filter 8 reaching the optical fiber 1. The signals of 1.49 μm and 1.55 μm wavelength come in from the optical fiber 1. The 1.49 μm signal passes two consecutive film-filters 7,8 reaching the receiver photodiode 4; and the 1.55 μm signal is reflected by the film-filters 7 reaching the optical fiber 2. In the termination of the optical fiber 2, a receiver photodiode may be attached.

In the structure of the triplexer, fragile film-filter 7,8 with the thickness of 0.1~0.01 mm is to be prepared together with the matching groove 9 for insertion of the filter 7,8; and a delicate procedure of film insertion into the groove 9 is to be performed. Such an optical filter 7,8 is usually prepared by a coating on a glass substrate, followed by separating it from the substrate then cutting it into appropriate size. Such procedure is to be repeated one by one. This involves still a significant problem in production even though there is some improvement compared to the former methods of using the filter in free space as in the FIG. 1.

While the patent "OPTICAL COMPONENT FOR FREE-SPACE OPTICAL PROPAGATION BETWEEN WAVEGUIDES" (U.S. Pat. No. 7,031,575 B2, Xponent Photonics Inc.) also releases a module similar to the method in the FIG. 2, but this method still involves similar problem of inserting thin films into grooves encountered previously in the production of the devices.

DISCLOSURE OF INVENTION

Technical Problem

This invention is contrived to solve the problems. One object of this invention is to produce an optical module with good production efficiency.

Another object of the invention is to contrive a structure of an optical module without any degrading quality of communication such as optical loss, cross-talk or others when splitting or combining optical signals of each wavelength.

Another object of the invention is to contrive a structure of an optical module where the film-filter is coated on the surface of the module, excluding the inconvenience of cutting grooves then inserting the filters into the grooves.

Another object of the invention is to provide an effective way to connect the light paths normal to the wafer to the optical waveguide parallel to the wafer, accommodating the requirement that the light path nearly normal to the film-filter improves the performances of the optical module such as splitting or combining each wavelength.

Another object of the invention is to provide a wafer-level process of planar fabrication which is appropriate for mass production of the optical module, replacing the former process such as filter insertion into grooves one by one.

Another object of the invention is to provide a mean to fix simply and efficiently the alignment of laser-diode or photodiode on the planar chip of the module during the fabrication process of bi-directional multi-wavelength transceiver (or transmitter-receiver) production.

Another object of the invention is to improve the productivity using a packaging technology of semiconductor device such as flip-chip bonding in fixing the photodiode or laser-diode on the surface of the module wafer.

The other object of the invention is to improve the efficiency in the optical interconnection of laser-diode or photodiode to optical waveguide, by attaching the laser diode or photodiode on an additional carrier then bonding again this to the wafer. Such carrier is used especially to aid the fixing of laser diode and the alignment in position.

Technical Solution

The first aspect of the present invention provides an optical module comprising: an optical waveguide on the upper side of a substrate; a cutout with at least two slant surfaces, passing at least the core of the optical waveguide; and a film-filter above or under the cutout parallel to the substrate. Preferably, at least one surface of the cutout is a slanting surface and may have an additional coated layer on it for optical purpose.

The 'slanting surface' transmits or reflects either partially or totally the wavelengths of light, which is delivered through the optical waveguide or the substrate surface, toward the substrate surface or into the waveguide. The 'film-filter' above or under the slanting surface transmits or reflects the light which is reflected from the slanting surface, according to the wavelength of light.

The 'optical module' is to be understood as a general term signifying the optical structure applicable to the area of optical communication, optical interconnection, and optical signal processing. The 'optical module' is the concept covering multi-wavelength optical transmitter or receiver and bi-directional optical transmitter-receiver (or transceiver) apparatus of more than two wavelength in the practice of this invention.

The 'cutout' is to be understood as the component that can be produced variously, not restricted to a particular way of cutout, including dry or wet etching, cut by machine tool, or others.

The description 'a cutout with at least two slant surfaces, passing at least the core of the optical waveguide' is to be understood as including variations in variety to embody the idea of this invention. For example, an optical waveguide terminated before reaching the slant surface, or the core of optical waveguide cut partially by the slant surface is to be included in the variations because the part of optical waveguide is related to the function of slant, the transmission or reflection of light.

The 'two slant surfaces' is not to be understood as the optical surfaces but as the outcome of the cutout that can be transformed selectively into optical surfaces, when necessary, by appropriate means as coating or others. The 'two' in the 'two slant surfaces' is to be understood as minimum facets for producing the cutout.

Preferably, the cutout is to be filled with a transparent optical medium to pass through the slant surface. Without filling in the cutout and coating the slant optically, the slant can also be used as a total-internal-reflection surface.

Preferably, the optical waveguide is furnished with an extension across the slant to continue the light propagation along the waveguide. It is desirable that an optical device is to be mounted additionally above or under the cutout. The 'optical device' in this invention is to be used as a general term signifying the device that includes an optical receiver or transmitter or some variations of those.

The optical waveguide (a first optical waveguide) can be formed at an angle to the projection of the normal of the slant (the first incidence angle in the plane of optical waveguide). Such layout of optical waveguide with regard to the slant can obstruct the back-reflection of lights from the film-filter or the optical device into the reverse direction of the first optical waveguide.

On the other hand, a second optical waveguide in addition to the first optical waveguide can be furnished in a layout angled to the slant as the first optical waveguide. The second optical waveguide receives the light from the first optical waveguide which is reflected by the film-filter and the slant surface.

In the light path among the slanted terminations of optical waveguides, the film-filter, and the optical device, at least one microlens can be furnished. Firstly, the microlens in the light path from the termination of optical waveguide to the optical device enhances the light coupling of the optical device and the optical waveguide. Secondly, the microlens in the light path between two terminations of optical waveguide, either on the same side of the slant reflected by the film-filter or across the cutout, reduces the passage loss between the waveguides.

Such microlens can be produced in variety, for example, engraving the reflowed lens-pattern of photoresist into the substrate surface by a transfer-etch method; inserting a higher refractive-index micro-ball-lens into the cutout followed by refilling the gap with a polymer or an epoxy fixing the lens in position; or Inducing the change in the refractive index of waveguide or fill-in materials by irradiating locally appropriate ultra-violet light or femto-second laser.

An implement can be furnished on the substrate, supporting and separating the optical device by some distance. The implement can also carry either the microlens formed in a body within the implement or the film-filter on it.

The microlens can be formed either symmetric or asymmetric for the rotation of about 90 degree in the plane of microlens, which aids especially the astigmatic correction of the laser transmitter.

Plurality of the unit optical module in this first aspect of the invention can also be configured to form a single optical module on the same substrate connected to each other through the optical waveguides.

The second aspect of this invention provides an optical module, comprising: a first and a second optical waveguide approaching each other on the upper side of a substrate; a third and a fourth optical waveguide approaching each other, having the approaching area, which is connected to the first and the second optical waveguide in extension; a cutout at the approaching area, comprising a first slant for cutting the first and second optical waveguide with a first cutting angle, and a second slant for cutting the third and fourth optical waveguide with a second cutting angle; and a film-filter formed on the approaching area.

Preferably, the first and third optical waveguide in extension and the second and fourth optical waveguide in extension are symmetric to the projections of the normals of the first and the second slant in the plane of the substrate; and the first and the second slant are symmetric to the normal of the substrate passing the crossing center of the optical waveguides. In this case, the intersection of the cutout and the plane of the slant normals preferably forms an isosceles or a right-angled triangle.

An optical device can be furnished additionally on or under the approaching area preferably with a film-filter and microlenses. A surface-emitting laser diode or a surface sensitive photodiode is exemplary of the optical device. On the other way, an implement supporting an optical device together with a film-filter or microlens can be furnished on or under the approaching area.

Preferably, some wavelengths of the incoming light from the first optical waveguide is to be transferred to the second optical waveguide reflected by the first slant and the film-filter; and some wavelengths of the incoming light from the third optical waveguide is to be transferred to the first optical waveguide across the first and second slant.

On the other hand, the cutout can be filled with a transparent optical medium; and can be backed up additionally by a light-absorbing medium to prevent a stray light. For example, at least one first layer of transparent glass or polymer, preferably accompanying a second backing layer of polymer or epoxy containing an absorber such as carbon black, provides the connection of light path across the cutout absorbing the stray light.

The first and second slant can also be coated asymmetric, depositing the optical films on both slants by a tilt angle, which results in the shift of optical characteristics of the optical films compared to each other.

The third aspect of this invention provides an optical module, comprising a first and a second optical waveguide approaching each other on the upper side of a substrate; a cutout at the approaching area, composed of a slant, cutting the first and second optical waveguide with an angle; and a film-filter formed on the approaching area: Wherein the first optical waveguide makes a first incidence angle with respect to the projection of the normal of the slant in the plane of the substrate, and the second optical waveguide receives the light from the first optical waveguide reflected by the slant and the film-filter.

The fourth aspect of this invention provides an optical module comprising a first and a second unit of the optical module, which are connected each other: Wherein the first unit of optical module, comprising a first and a second optical waveguide approaching each other on the upper side of a substrate; a first cutout at the approaching area, composed of a first slant, cutting the first and the second optical waveguide with an angle; and a first film-filter formed on the approaching area: The first optical waveguide makes a first angle of incidence with respect to the projection of the surface normal of the first slant in the plane of the substrate, and the second optical waveguide receives the light from the first optical waveguide reflected by the first slant and the first film-filter:

Wherein the second unit of optical module, comprising the second and a third optical waveguide approaching each other on the upper side of a substrate; a second cutout at the second approaching area, composed of a second slant, cutting the second and third optical waveguide with an angle; and a second film-filter formed on the second approaching area: The second optical waveguide makes a second angle of incidence with respect to the projection of the surface normal of the second slant in the plane of the substrate, and the third optical waveguide receives the light from the second optical waveguide reflected by the second slant and the second film-filter.

Preferably, the first and second film-filters are composed of the same structure; but the first and second angle of incidence are different.

The fifth aspect of this invention is to provide the fabrication procedures of an optical module, comprising the step of forming the optical waveguide on the wafer substrate; the step of forming the cutout with slant surfaces from the front-side or from the back-side of the substrate passing at least the core of the optical waveguide; and the step of coating the optical films on the slant optionally and on the area of approaching waveguides:

Wherein the cutout can be produced by an anisotropic wet-etching from the backside of a silicon substrate followed by transferring the wet-etched pattern into the waveguide layer by dry-etching; or can be produced directly from the front-side of substrate by dry-etching the waveguide layer using a properly profiled etch-mask of silicon or photoresist.

It is also possible to produce the cutout by machining the waveguide layer using a proper machine tool such as a rotating grinder.

Advantageous Effects (1) Optical signals of specific wavelengths can be separated out from the optical waveguide or combined into the optical waveguide either forward or reverse direction of the optical waveguide.

(2) Using this invention, highly efficient bi-directional multi-port multi-wavelength optical transceivers which is simple to align its component elements can be effectively and reliably produced from the front and back side of the wafer through a wafer-level process: Such a wafer-level process produces simultaneously hundreds of optical waveguides, film-filters, plurality of optical surfaces which are necessary for combining or splitting the wavelength of the optical signals excluding the one-by-one process for each device.

(3) The productivity and reliability of the optical module can be improved in a jump by coating the optical films on the wafer surface instead of inserting discrete films one by one into grooves and fixing these using an epoxy as in a traditional way.

(4) The performances of each kinds of optical films can be optimized: The film-filters on the wafer surface are used for separating or combining the closely spaced wavelengths as the receiving channels of 1.49 µm and 1.55 µm in the triplexer, and the optical film on the first slant is used for separating or combining the sparsely spaced wavelengths as the transmitting channel of 1.31 μm in the triplexer into the reverse path of receiving, standing apart from 1.49 μm. In other word, the polarization dependence in the separation of closely-spaced wavelength channels can be improved by adopting a structure of crossing waveguide with a slant, where the crossing angle can be chosen small as desired within the range of preventing the cross-talk between the waveguides.

(5) The size of the optical module is reduced: One unit of a cross-waveguide has three optical sets of films with four waveguide and two optical devices on top and bottom of the substrate, which enables a compact structure as shown in the embodiment of triplexer.

BRIEF DESCRIPTION OF THE DRAWINGS

The above and other features and advantages of the present invention will become more apparent to those of ordinary skill in the art by describing in detail exemplary embodiments thereof with reference to the attached drawings in which:

FIG. 1 is the structure of a BiDi-triplexer using conventional optical-filter technology.

FIG. 2 is the structure of triplexer using a conventional technology of optical waveguide.

FIG. 3 shows a structure of an optical module according to the first embodiment of this invention.

FIG. 4 shows a structure of an optical module according to the second embodiment of this invention.

FIG. 5 shows operation of a bi-directional 3-wavelength optical transmitter-receiver assembly according to the optical module in the FIG. 4.

FIG. 6 is a graph showing a cross-angle dependence of light-coupling by the triple-reflection between the first and the second optical waveguides; a microlens enhances the coupling.

FIG. 7 is procedure of fabricating the optical module by an etching method. A slant surface is produced from the backside of wafer.

FIG. 8 is scanning electron micrograph of the cutout of an optical waveguide produced by the transfer-etch of the wet-etched silicon substrate.

FIG. 9 shows optical made of crossing waveguide with a cutout. A slant surface is produced from the front of the wafer.

FIG. 10 shows a structure of a bi-directional 4-wavelength optical transmitter-receiver assembly according to the third embodiment of this invention.

FIG. 11 shows a structure of an optical module using the fourth embodiment of this invention.

FIG. 12 shows a structure of an optical module using the fifth embodiment of this invention.

MODE FOR THE INVENTION

Hereinafter, exemplary embodiments of the present invention will be described in detail. However, the present invention is not limited to the embodiments disclosed below, but can be implemented in various forms. Therefore, the following embodiments are described in order for this disclosure to be complete and enabling to those of ordinary skill in the art.

(The First Embodiment)

FIG. 3 is a plan-view and cross-section of the optical module according to the first embodiment of this invention.

Referring to the FIG. 3, the optical module of the first embodiment comprises an optical waveguide 120 formed on a substrate 100; a cutout 130 with at least two slant surfaces passing at least the core 120b of the optical waveguide with a slant 132; an optical film (not-illustrated) coated optionally on the slant 132; and a film-filter 133 above the cutout 130.

Referring to the FIG. 3, the optical waveguide 120 comprises the first waveguide 136 on the input side and the second waveguide 137 on the opposite side. But it is also possible to configure an optical module using only one of these 136,137 when necessary. When the optical waveguide 120 has a function of transmitting light through the slants 132,134, it is desirable for the cutout 130 to be filled with a transparent optical media. The slants 132,134 may be a total-internal reflecting surface without any coating when the fill-in media is absent. The optical waveguides 136,137 can also be tilted to some degree, for example 8 degree in the x-y plane, to prevent the reflection by the optical device 140 or the film-filter 133 back into the input optical waveguide.

It is also possible to form the first optical waveguide 136 and the second waveguide 137 on the same side of the cutout 130. For example, the first optical waveguide makes a first angle to the projection of the slant normal on the substrate 100; and the second optical waveguide is provided on the same side for receiving the light from the first optical waveguide reflected by the slant and the film-filter above the slant.

Preferably, each slant 132,134 is furnished with a multi-layered coating (not-illustrated) for transmitting or reflecting according to the wavelength of incident light. It is possible to operate with a reflection-coating as metal-coating or even without any coating. The slant normal makes preferably 45 degree to the x-y plane; which ensures nearly normal incidence to the film-filter 133 and the interconnection between the input and the output optical waveguides.

Preferably, the film-filter 133 is a multi-layered coating transmitting or reflecting the incident light according to the wavelength of light.

An optical device 140 may be attached on the film-filter 133. The optical device 140 can be an optical transmitter or an optical receiver; and can be attached simply, for example, using a common method of flip-chip bonding. The optical transmitter can be a VCSEL (Vertical Cavity Surface-Emitting Laser) or a HCSEL (Horizontal Cavity Surface-Emitting Laser); and the receiver can be a surface-sensitive photo-diode. An edge-emitting laser can also be used if the laser beam is directed to the substrate preferably by adopting an additional carrier Such carrier rotates the laser beam to 90 degree as the carrier used in the common TOCAN packaging of edge-emitting laser.

Material of the substrate 100 can be a variety on which an optical waveguide is formed. Preferably, a silicon substrate is used to form a silica-based optical waveguide.

Using the optical module of the first embodiment, the productivity of the optical module is enhanced simply by providing the film-filter 133 and the slants 132,134, which is indispensible to splitting or combining the optical wavelength, to the optical path of waveguide in a compact structure. For example, the optical coating of film-filter on the slant can be done simply by introducing the cutout by etching or cutting from the top or bottom of the wafer; thereby transmitting or reflecting selectively the light signals from the optical waveguide according to its wavelength. Furthermore, the reflected light from the slant is filtered secondly according to its wavelengths by reflecting or transmitting at the film-filter 133 on top of the waveguide.

We can receive the signals transmitted through the film-filter 133 by placing the optical receiver on the film-filter 133 using a simple procedure as flip-chip bonding. On the other hand, we can launch the light through the reverse direction of the optical path, placing an optical transmitter instead of an optical receiver on the film-filter 133. We can produce a variety of optical module such as BiDi-triplexer and multi-wavelength optical transmitter or receiver using the optical module as a unit element. In the following are explained these.

(The Second Embodiment)

The FIG. 4 shows the plain-view and the cross-section of the 3-wavelength BiDi optical transceiver employing the principle of this invention.

Referring to the FIG. 4, the BiDi triplexer according to the second embodiment is furnished with the first and the second optical waveguide 36,37, the third and the fourth optical waveguide 38,39, the cutout 30, and the film-filter 33. Preferably the cutout 30 is filled with an optical media.

The first and the second optical waveguide 36,37 has a mutually crossing area $L_1,L_2$ on the substrate 10; and the third and the fourth optical waveguide 38,39 are connected to each of the first and the second optical waveguide 36,37 through the crossing area $L_1,L_2$.

The cutout 30 is formed in the crossing area $L_1,L_2$, and is furnished with the first slant 32 cutting the first and the second optical waveguide 36,37 with a first cutting angle ($\Phi_1$) and the second slant 34 cutting the third and the fourth optical waveguide 38,39 with a second cutting angle ($\Phi_2$). The first and the second cutting angle is preferably 45 degree as described in the first embodiment.

The optical module in this embodiment has additionally an optical receiver 40 on the crossing area $L_1,L_2$ of the optical waveguide 20. Preferably, a film-filter 33 can be furnished between the optical waveguide layers 20 on the crossing area $L_1,L_2$ and the optical device 40.

In the optical waveguide layer 20, the first and the third optical waveguide 36,38 makes an angle θ to the projection of the normal of the first slant 32, and the second and the fourth optical waveguide 37,39 forms the symmetric structure to the first and third optical waveguide 36,38. Desirable range of incidence angle (θ) is 1 to 25 degree.

The first and the second slant 32,34 make about 45° to the surface 31 of the substrate 10 and are coated with a metal or a multi-layered dielectric material. The first 32 and the second slant 34 each with the first ($\Phi_1$) and the second cutting angle ($\Phi_2$) transmit or reflect lights from the two optical waveguides.

According to the second embodiment, multi-wavelength light signals come from the first optical waveguide 36 maintaining an incident angle (θ) to the projection 35a of the normal of the first slant 32. The first and the second wavelength among these are reflected by the first slant 32 and projected into the film-filter 33. The angle incident to the film-filter 33 then makes the same angle (θ) as that of the incoming waveguide.

Among the light signals incident to the film-filter 33, only the second wavelength transmits the film-filter 33 reaching the optical receiver 40 above the film-filter 33. Other wavelengths are reflected back to the first slant 32, then to the second optical waveguide 37.

On the other hand, the optical signal with the third wavelength comes in through the third optical waveguide 38; and passes through the second and the first slant 34,32, going out through the first optical waveguide 36.

FIG. 5 is a schematic showing the operating principle together with the port configuration of the 3 wavelength BiDi optical transceiver in the FIG. 4.

Referring to the FIG. 5, the first slant 32 and the second slant 34 are reflecting the optical signal of the 1.49 μm and 1.55 μm wavelength incident from the first optical waveguide 36 and are transmitting the optical signal of the 1.31 μm wavelength incident from the third optical waveguide 38; and the film-filter 33 is reflecting one of the 1.49 μm and 1.55 μm wavelength and transmitting the other.

The first and the second optical waveguide 36,37 (or the third and the fourth optical waveguide 38,39) can adjoin together in the side approaching the first slant 32 (or the second slant 34) for the optical alignment between the optical waveguides.

The optical waveguides can have a spot-size converter changing the guiding structure in vertical and horizontal direction. FIG. 5 illustrates a spot-size converter tapered in width and thickness of the waveguide; but other structures of spot-size converter can also be applied.

The first and the second optical waveguide 36,37 can be aligned straight virtually through its mirror image produced twice by the first slant 32 and by the top surface above the first slant 32; and the light incident from the first waveguide 36 travels within the plane vertical to the substrate in the waveguide top-cladding, until the incident light exits to the optical receiver or to the second optical waveguide 37 through triple-reflection. In this passage of light, no light-guiding structure is provided, resulting in some diffraction of light. As a result, some optical loss can occurs in this optical interconnection between the first 36 and the second optical waveguide 37.

When a waveguide has large difference relatively in the refractive indices of the core and the cladding, adopting a spot-size converter is desirable to reduce the loss. On the contrary, when the difference is small as 0.25%, the mode size of the waveguide larger than 10 μm and the loss can be made small by optimizing the structure of waveguide. For example, the typical thickness of upper-cladding is 20 μm in case of 0.25% optical waveguide and the diffraction of such a mode field occurring in the 40 μm round-trip between the first slant 32 and the film-filter 33 can be made as small as 0.5 dB.

FIG. 6 shows the cross-angle dependence of light-coupling by the triple-reflection between the first and the second optical waveguides. A numerical simulation is used in the calculation based on the optical module in the FIG. 5. Addition of a microlens on the crossing area $L_1,L_2$, as that in the FIG. 9 with the film-filter on top of the microlens, enhances the coupling loss from 0.4 dB to 0.25 dB which is negligible in common applications. Details on the microlens in use is explained in the fourth and fifth embodiments.

Similarly, the incident light from the third waveguide 38 is to be launched into the first optical waveguide 36. No optical waveguide is defined between the second slant 34 and the first slant 32. Thereby, the spot-size converter is employed for the same reason to reduce the loss. Preferably, the spot-size converter expanding the mode field both in horizontal and vertical direction is desirable, but in some cases a spot-size converter expanding only in one direction, either horizontally or vertically, can be used. The calculated light coupling from the first to the third optical waveguide, based on the configuration in the FIG. 4, shows the loss of less than 0.3 dB.

A microlens in the light path between the first and the third optical waveguide can reduce further the coupling loss. Such microlens can be produced in variety, for example, by inserting a higher refractive-index micro-ball-lens into the cutout followed by refilling the gap with a polymer or an epoxy fixing the lens in position; or by inducing locally the change in the refractive index of waveguide or fill-in materials of the cutout by irradiating locally appropriate ultra-violet light or femto-second laser.

Generally, the TM (Transverse Magnetic) polarized light has much lower reflectivity than the TE (Transverse Electric) polarized light as the incident angle at reflection approaches the Brewster angle. Therefore, in case of optical surface with 45 degree angle of incidence, the design of an optical filter with low dependence on polarization is very difficult in principle, and the layer of film-filter stacks up sometimes even to 100 layers to get the desired optical performances.

In designing an optical module, the light incident to the film filter 33, referring to the FIG. 5, has the same angle of incidence θ as the first optical waveguide 36 has to the projection 35a of the normal of the first slant. Therefore, the θ can be chosen during the layout design of the optical waveguide. The angle θ can be chosen to be near to the normal of the substrate, which makes it easy to design the film-filter 33 with low dependence on polarization. On the contrary, if the angle θ is too small, a cross leakage of light from the first 36 to the fourth optical waveguide 39 or a back leakage from the first to the first optical waveguide 36 occurs. The preferred range of θ is from 1 to 25 degree.

Preferably, the first slant 32 and the second slant 34 are to be coated the same as symmetric surfaces. The cutout 30 is to be filled with a transparent optical media as optical glasses or polymer materials, having the same refractive index as that of the optical waveguide. For example, the cutout can be filled with a silica-based glass deposited by CVD (Chemical Vapor Deposition) up to a waveguide thickness, then be filled additionally with a polymer-based material preferably containing some carbon black. The carbon black may absorb stray lights from the optical surfaces, the waveguide crossing or the media filling the cutout, eliminating the noise to the optical receiver.

It is worthwhile to mention that the films on the first 32 and the second slant 34 of the cutout 30 can be coated at a different ratio by depositing at an inclined angle. In this case, the stacked films on each side of the slants 32,34 has a fixed ratio in theirs thicknesses, depending on the inclined angle, which results in some shift in the spectral window of reflection or transmission. Using this method, the optical characteristics of the first 32 and the second slant 34 from a single pattern of a cutout can be tuned differently. This method of tuning is applied in the fifth embodiment.

The third optical waveguide 38 in direction of piercing the first and the second slant 32,34 is selected for the transmission of 1.31 μm wavelength in reverse direction. On the slant, the filter having good characteristics of wavelength separation is difficult to design, because the angle of slant is close to the Brewster angle, hence resulting in a significant dependence of reflection or transmission on the polarization. Therefore, the slants are used for combining filter for the remote wavelength of 1.31 μm to the two close wavelengths of 1.49 μm and 1.55 μm. On the other hand, the film-filter on the top of waveguide is suited better for splitting proximity channels of wavelengths as 1.49 μm and 1.55 μm, because the incident angle to the film-filter can be made as small as necessary in the layout of the optical waveguides.

Plurality of the module shown in FIG. 5 can be combined together in variety of combination, which results in not only a single-port optical module but also many multi-port optical module transmitting or receiving in multi-wavelength channels (refer to the FIG. 10). This will be explained later in the followings.

Referring to the FIG. 7, the procedure of fabricating the optical module in the embodiment of the invention is described in sequence. The FIG. 7 shows the cross section of the optical module.

Firstly, the surface of the silicon substrate 10 is the plane [100] or the plane tilted from [100] by some angle and polished on both sides. Such a particular orientation of the substrate produces a specific angle of facet by the well-known anisotropic etch of silicon substrate, determined by the angle of the crystal axis of silicon to the surface normal of the substrate. Considerate selection of the wafer orientation helps to control the facet angle of the cutout in the following anisotropic etch of the silicon substrate.

Referring to the FIG. 7(a), the base layer (20a; or lower cladding) of the optical waveguide 20 is formed on the wafer; and the cutout of a pyramid shape is etched out from the backside of the substrate 10. The base layer is produced either by oxidizing the silicon wafer or by depositing a silica-based glass using a CVD (chemical vapor deposition) or FHD (Flame hydrolysis deposition). Oxidation of silicon occurs at both side of the substrate. Removing the oxide from the backside of the substrate, using a negative photomask of square pattern, exposes the base of the proposed cutout in a pyramid shape; then the area is etched into a pyramid shape using a common way of anisotropic wet-etch.

When CVD or FHD is used, instead of oxidation, for producing the lower cladding of the optical waveguide, it deposits a silica-based glass only on a single side. Therefore, a silicon nitride layer is deposited at the backside as a masking layer for the following anisotropic etch; and photo-patterning the square followed by etching the nitride exposes the base of the proposed cutout. The exposed area is then etched into a pyramid shape by the same procedure as before, and the remaining silicon nitride layer is removed.

Referring to the FIG. 7(b), the core and the upper cladding 20b,20c of the optical waveguide 20 is produced on the lower cladding 20a and the film-filter is deposited on the upper cladding 20c. The alignment of the optical waveguide in precise position to the cutout on the substrate is important for the proper operation of this invention; and is provided in this embodiment. In other words, the patterns of optical waveguide is aligned to the square on the top of the pyramid hollow, which is visible through the lower cladding 20a.

The upper cladding is uneven sometimes due to the profile of the waveguide core and can be planarized by a common method of planarization. On the planarized surface of upper cladding, the film-filter is deposited selectively. For example, a lift-off method can be used for selective deposition, which deposits a sacrificial layer using a photomask followed by coating the film-filter then removing the sacrificial layer.

Referring to the FIG. 7(c), the pattern of the cutout in the substrate is transferred into the waveguide layer from the backside of the substrate, simultaneously etching the slant of silicon and the exposed area of waveguide layer until the layer of film-filter is approaching. Pattern transfer across the interface of silicon and waveguide layer usually changes the aspect ratio in depth, which can be tuned preferably to produce 45 degree slant of the cutout by controlling the various conditions such as the relative partial pressures of oxygen, hydrogen fluoro-carbon, hydro-fluoro-carbon, and/or argon; relative bias power and/or RF power; and pressure. Especially, the relative partial pressures of each gases and RF/Bias power is key parameters. FIG. 8 shows the scanning electron micrograph of the cutout of an optical waveguide produced by the transfer-etch of the wet-etched silicon substrate. Table 1 shows an exemplary recipe of the transfer etch.

TABLE 1

| Sample NO | TX9 | TX10 |
| --- | --- | --- |
| RF Power [W] | 1800 | 1800 |
| BiasPower [W] | 120 | 150 |
| CF4 Flow [sccm] | 75 | 80 |
| CHF3 Flow [sccm] | 30 | 35 |
| O2 Flow [sccm] | 10 | 15 |

TABLE 1-continued

| Sample NO | TX9 | TX10 |
|---|---|---|
| Ar Flow [sccm] | 10 | 20 |
| Pressure [mTorr] | 4 | 4 |
| Etch Time [min] | 30 | 30 |

The slant angle of the undercladding can be different from that of the overcladding after the transfer-etch of silicon slant into the waveguide layers. This is due to the variation in material compositions of each waveguide layers. An appropriate selection of material in layers together with an appropriate recipe of the transfer-etch corrects most of this problem. An additional deposition of low-melting material on the cutout slant as boro-phospho-silicate glass or polymer, followed by annealing at an appropriate temperature through melting, also helps to correct such an uneven feature of the cutout slant. The roughness of slant is also improved in this process as good for an optical use.

Referring to the FIG. 7(d), an appropriate structure of optical films is deposited on the slant of the cutout. Deposition normal to the substrate as in the FIG. 7(d) results in the same films on both sides of the cutout, but some shift from the normal produces two different stacks of films on each side of the cutout with constant ratio in every layers.

Referring to the FIG. 7(e), the cutout is filled with a backing optical media, and then the optical device is bonded on top of the cutout. The backing optical media can be a polymer-based material, a silica-based material produced by either CVD or FHD, or a multi-layer of the foresaid materials.

FIG. 9 shows another structure of the optical module in this embodiment. In the module shown in the FIG. 9, only one slant of the two surfaces of the cutout is preferably to be coated and activated into an optical surface while the other is to be turned into a transparent one by filling in a transparent medium of matching refractive-index. We may regard this module as having only one optical slant even if we produced two slants in the procedure of the cutout.

Explaining mainly the difference from the procedure described the FIG. 7, the cutout 30 is produced on the front side of the substrate where the waveguide layer 20 is produced. Such structure can be produced easily by machining a V-shaped groove on the waveguide layer 20 using a proper machine tool.

Firstly, an optical waveguide is produced on the substrate 10. Then, a rotating machine tool such as disk saw, preferably having a properly shaped cutting edge, cuts the waveguide layer in depth moving along the surface. The cutting edge here means a properly shaped grinding surface treated with diamond powder. The cross-section of the cutting edge may be composed of two sides with an appropriate angle. Using such a tool, a properly shaped groove, which is composed of two facing surfaces with angles to the substrate, can be machined along the surface of the substrate. Proper use of a machining tool produces a typical accuracy of 1 µm, which is sufficient in producing the optical module of this invention. Of course, the groove with the slant angle of 45 degree can be realized.

Another way of producing the cutout with the slant angle of 45 degree is to use a well-known method of wafer-bonding, which is common in producing a silicon-on-insulator wafer. An additional wafer of silicon is bonded to the wafer with a waveguide layer. Then, the bonded wafer of silicon is grinded out to an appropriate thickness. The cutout of a pyramid-shape is produced by anisotropic etching of the attached wafer, followed by the transfer etch of the cutout into the waveguide layer in depth as explained in the FIG. 7.

Another way of producing the slant of 45 degree from the front-side of substrate is to use a grey-scaled mask (grey-scale; the multi-level shading of a mask), which is used sometimes in the semiconductor industry. A V-shaped cross-sectional pattern of photoresist using a grey-scaled mask is produced, and then transferred directly into the waveguide layer using a dry-etching method.

When producing the cutout from the front-side of the waveguide wafer, it is also necessary to deposit an optical coating on the slant of the cutout, then to fill the cutout with transparent optical media, followed by planarizing the surface of the fill-in material The fill-in material can be either an optical polymer or a silica-based glass.

(The Third Embodiment)

FIG. 10 is the schematic layout of 4-wavelength optical transceiver produced applying the optical module in this invention. Each component module 56,57,58,59,60 in the FIG. 10 represents the optical module in this invention as in the FIG. 3. The unit modules 56,57,58,59,60 are furnished with the film-filters 56a,57a,58a,59a,60a, optical devices 56b,57b,58b,59b,60b, and the cutouts with the slants (not-illustrated)

The 4-wavelength optical transceiver in the third embodiment has the receiving wavelengths of 1.49 µm, 1.55 µm, and 1.61 µm, and the transmitting wavelength of 1.31 µm. The IO (Input-output) port 51a of optical signal to external is connected to the first unit of optical module 56 through the optical waveguide 51. The first unit of module 56 receives one channel of wavelength and combines one channel of transmission wavelength into the reverse direction of the incoming optical path. The second and the third unit of module 57,58 connected by the optical waveguides 52,54 splits the receiving optical signal into each of its wavelength.

The fifth and the fourth unit of module 60,59 connected by the optical waveguides 53,55 combines the transmission signals of each wavelength or monitors the operation of the laser transmitter.

The structure in this embodiment separates the transmission and the reception signals into two independent paths of waveguide at the first unit of module 56, which reduces the cross-talk between the incoming and the outgoing signals.

Referring to the FIG. 10, the optical device 56b in the first unit of module 56, located above the first slant of the cutout, receives one channel of wavelength by filtering of 56a separated from the incoming signals. On the other hand, it is worthwhile to mention that the optical device 56b can also be located above the second slant of the cutout for monitoring the transmitting signals.

In this embodiment, it is possible to input or output the receiving or transmitting light all from the wafer surface; and the optical transmitters or receivers can be mounted easily on the film-filters 56a,57a,58a,59a,60a using a flip-chip bonding method. The transmitters or receivers used in this case are surface-absorbing photodiodes or surface-emitting lasers as described before.

In the followings, the operating principle of the optical module is explained taking an example of 4 wavelength, 1.31 µm for transmission and 1.49 µm, 1.55 µm and 1.61 µm for reception. The receiving signals, coming from the external optical fiber through 51a, comes into the first unit of the module 56 making an angle of incidence θ1 through the optical waveguide 51; then reflected by the film-filter 56a except for the 1.49 µm signal. The 1.49 µm signal is delivered to the optical receiver 56b where it is converted into the electric signal. Other signals as 1.55 µm and 1.61 µm are guided by the optical waveguide 52.

The optical waveguide 52 guides the 1.55 µm and 1.61 µm light into the second unit of the module 57 making an angle of incidence θ2. The 1.55 µm signal passes across the film-filter 57a in the second unit of the module 57; and is converted into the electric signal by the optical receiver 57b. The other signal of 1.61 µm is guided into the optical waveguide 54.

The optical signal of 1.61 µm from the optical waveguide 54 comes into the third unit of the module 58 making an incident angle of θ3; Then, it passes across the film-filter 58a and converted into the electric signal by the optical receiver 58b. Here, the film-filter 58a is used for cutting off all the other wavelength such as 1.31 µm, 1.49 µm and 1.55 µm. When the signals of 1.31 µm, 1.49 µm and 1.55 µm are weak enough, the filter 58b can be excluded.

On the other hand, the upstream signal, generated by the transmitter 59b on the fourth unit of the module 59, is launched into the optical waveguide 55 passing the anti-reflection coating 59a; then is delivered to the fifth unit of the module 60, where the signal is delivered partially to the optical receiver 60b through the film-filter 60a. The remainder of the signal is reflected and launched into the optical waveguide 53. Here, the optical device 60b in the fifth unit 60 is used as a monitor photodiode (mPD). Again, the transmission signal from the optical waveguide 53 transits the two slants of the first unit of the module 56 and exits to the external optical fiber through the optical waveguide 51 and IO port 51a.

The film-filters 56a,57a,58a on the first to the third unit of the module 56,57,58 is normally to be coated differently, which means different depositions for each film-filter on the modules. We may reduce the number of deposition by one, introducing different angles of incidence, $\theta_1$, $\theta_2$, and $\theta_3$, for each optical waveguides connected to the modules. This utilizes the fact that the transmission window of a film-filter is shifted by the change of incidence angle even though the thin films 56a,57a,58a of the modules are the same.

The optical coating on the 45-degree slant of the second to the fifth unit of the module 57,58,59,60 is a reflective one in broad window of wavelength, and can be a metallic coating, a dielectric coating, a total-internal-reflection surface without any coating, or a combined one of these.

The transmission windows of the film-filters 56a,57a,58a for the first to the third unit of the module 56,57,58, which are the receiving ones, are closely spaced and multi-layered dielectric typically composed of tens of layers. Choosing the angle of incidence near to 0-degree facilitates the design of film-filter and can results in high isolation between closely spaced channels of wavelength and low dependence on the polarization.

The film-filter 59a on the fourth unit of the module 59, where the optical transmitter is placed, can be either an anti-reflective one or a none (no coating). The film-filter 60a on the fifth unit of the module 60 reflects partially the incident light and can generally be coated by a dielectric or a metal, or by a combined one of these.

In this embodiment, coupling of an edge-emitting laser, a traditional one as a transmitter module, directly to an optical waveguide can also be applied instead of the coupling from the wafer surface using a surface-emitting laser. An area of square for a transmitter module, in place of the fourth unit of the module 59, is dry-etched into an appropriate depth from the top of the substrate; and the edge-emitting laser is fixed into the bottom of the etch in alignment with the core of the optical waveguide exposed on the side wall of the etch.

As a modification, this embodiment can be applied as the followings when the transmission wavelengths are closely spaced. The unit module is composed only of the first and second optical waveguides, the first slant, and the film-filter (36,37,32,33 in the FIG. 4). Plurality of the unit module is connected by optical waveguides as zigzag, which can be configured as a wavelength multiplexer or demultiplexer. Here, the first slant 32 in the FIG. 4 is a reflective mirror for all wavelength; and the film-filters above the slant do the wavelength selection.

On the other hand, the optical path allocated to any channel of wavelength is a reversible path, that is the receiving and the transmitting can be used in exchange. Therefore, replacing a transmitter by a receiver on any film-filter can change the function of transmission to that of reception and the reverse holds similarly.

The optical device commonly used in optical communication is a surface-absorbing photodiode, an edge-emitting laser or a VCSEL. The diameter of the active area of a surface-absorbing photodiode is typically 20 to 100 µm, which is large enough to facilitates the alignment of the photodiode by flip-chip bonding.

On the contrary, the diameter of the light-emitting area of an optical transmitter is only a few micrometers in general. Therefore, an additional means such as lens or spot-size converter are necessary to connect the optical path from the transmitter to the optical waveguide in the module in this invention. Some embodiments are illustrated in the followings referring to the FIGS. 9 and 10.

(The Fourth Embodiment)

FIG. 11 shows the cross-section of the optical module according to the fourth embodiment in this invention.

Referring to the FIG. 11, the optical module of the fourth embodiment is furnished with the optical waveguide 20 formed on the substrate 10; the cutout 89 with the slant 88,86 passing at least the core 20b of the optical waveguide 20; and the film-filter 83 on the microlens 84a. The carrier 81 carrying an optical device 85 is installed additionally above the film-filter 83. The carrier provides an optical path along its central axis in a pyramid-shaped hollow 82, which passes the film-filter 83 and the micro-lens 84, then, reaching the optical device 85. The remainder of the hollow 82 is usually left as vacant; but can be filled optionally by an optical medium when necessary.

The carrier 81 aids the optical connection from the slanted termination of optical waveguide 20 to the optical device 85, either a transmitter or a receiver, through the surface of the substrate. It fixes the position of the optical device 85 on the substrate 10 and provides a space for optics between the device 85 and the optical waveguide 20. A receiver device may not need the carrier because the diameter of the sensing area for receiver is large enough as 50 µm compared to the dimension of the waveguide 20, typically, 6 µm to 8 µm. On the contrary, a transmitter devices, such as a surface-emitting or an edge-emitting laser, need generally a micro-lens to match the mode size of a laser to that of a waveguide; and a carrier provides an appropriate distance from the lens to the laser diode. Here, an optical module with a laser on a carrier is illustrated.

According to the structure of this embodiment, the transmitter (or laser) 85 is placed on the carrier 81 above the slant 86; a microlens 84a is located with some separation to the slant 86; and an additional microlens 84b,84c is furnished in a body with the carrier 81. This is to achieve an optimum matching of the mode fields between the optical waveguides 87a,87b, together with an optimum matching of the mode fields of the laser diode 85 to that of the waveguide 87a or 87b.

To accomplish such a purpose, a laser diode is fixed on an additional carrier 81 of which the central part is cleared as a pyramid shape; and the carrier is aligned optically and fixed on the surface of the substrate 10. The carrier is fabricated using an anisotropic etching of silicon wafer, which is commonly known as a SiOB (silicon optical bench) technology.

The microlens can be produced on the overcladding of waveguide above the cutout (or on the fill-in of the cutout). A circular (or polygon; elliptical) pattern of photoresist on the glass (or polymer) layer is made round as lens by the surface tension of photoresist through melting of that; then the lens-like photoresist is transferred to the bottom layer by a dry etching.

Usually, the microlens is produced upon the additional layer of glass on the film-filter. In this embodiment, the micro-lens is first produced on the top surface of waveguide wafer, and then be coated by an film-filter (a film-filter). Therefore, the coated film layer follows the profile of the lensed surface. Preferably, the diverging phase front from the optical waveguide 87a or 87b has the same curvature as that of the film-filter 84a on the microlens 84a but is on the off-axis from the normal of the substrate.

In this configuration, the film-filter on the lensed surface focuses the light of reflected wavelength from the incident waveguide 87a to the outgoing waveguide 87b with aid of the 45-degree slant 86, while the light of the other wavelengths go through the film-filter without any distortion of the phase front. Light coupling of the laser diode 85 to the optical waveguide can be done independently by the lens 84b,84c. The passage loss due to the diffraction between the waveguide 87a and 87b can be eliminated by focusing as illustrated in the FIG. 6.

An example of forming the micro-lens inside the carrier is illustrated. Silicon wafer polished on both side is oxidized as thick as 15 μm. The hollow of a pyramid shape is produced on the oxidized wafer by photo-masking and anisotropic etching. The thick oxide remains on the top of the carrier after the etch for next step. Then, stacking layers 84c,84b from lower to higher refractive index within the hollow 82 produces a micro-lens. Preferably, melting the previously stacked layer in between can round off the surface profile of the stacked layer and can controls the converging property of the lens. Each layer can be silica-based glasses or optical polymers deposited by FHD, CVD, spinning of optical polymer, or others. Stacking layers from higher to lower melting temperature is preferred.

The layer of silicon dioxide 81a on top of the carrier 81 provides an additional optical surface for a second film-filter. Therefore, two ways of forming micro-lens and film-filter each are provided in this embodiment.

The microlens system can be either symmetric or asymmetric about 90 degree rotation about the normal of the wafer surface. The asymmetric lens can be produced easily by using an asymmetric pattern such as rectangle or ellipse, which results in two different profiles of lens along the two orthogonal axes of the lens. The asymmetric lens is especially useful for correcting the astigmatism of the laser diode.

The light-coupling of laser diode into the optical waveguide 87a or 87b is on the off-axis from the central axis of the hollow 82 in the carrier 81, which is on the refracted angle based on the θ in the plane normal to the substrate at the wafer surface as that of the waveguide on the substrate. Such an off-axis coupling can be accomplished by an off-axis alignment of laser diode on top of the carrier chip. It is worthwhile to note that the combined lens system of 84, one on the substrate and the other inside the carrier, can handle simultaneously the focusing of the light from the waveguide 84a into the waveguide 84b and the focusing of the light from the laser diode (optical device 85) into one of the foresaid waveguides 84a,84b.

(The Fifth Embodiment)

FIG. 12 shows the cross-section and the plan-view of the optical module according to the fifth embodiment Referring to the FIG. 12, the optical module of the embodiment is furnished with an optical waveguide 20 on the substrate 10; the cutout with the first and the second slant 96a,96b passing at least the core 20b of the optical waveguide 20; the first thin film (not illustrated) coated on the first slant; the second thin film (not illustrated) coated on the second slant; the first film-filter 98a above the cutout; the first optical device 99a on the first film-filter 98a; the second film-filter 98b under the cutout; a carrier plate 95 supporting the second film-filter 98b; and the second optical device 99b on the second film-filter 98b.

This embodiment is another illustration of a bi-directional 3-wavelength transceiver as described in the second embodiment. The downstream analog optical signal of 1.55 μm 91, incident from the input optical waveguide 20ba, reflects from the first slant 96a; passes the first film-filter 98a passing the light-shield 97a; then detected by the first optical device 99a. The downstream digital optical signal of 1.49 μm 92 incident from the input optical waveguide 20ba passes the first slant 96a; reflects from the second slant 96b; passes the second film-filter 98b passing the light-shield 97b; then detected by the second optical device 99b. The first film-filter 98a is a cut-off filter for the 1.49 μm signal and the second film-filter 98b is a cut-off filter for the 1.55 μm signal. The light-shield 97a,97b is added additionally for shielding the stray-light which breaks away from the specified path defined by 91, 92, and 93. On the other way, the upstream digital optical signal of 1.31 μm 93 is coming from the other side 20bb of the input optical waveguide 20ba and is combined into the reverse path of the input optical waveguide passing through the second slant 96b and the first slant 96a.

The first optical device 99a on the upper side of the substrate 10 is separated from the optical waveguide 20 only by a few tens of microns. Therefore, the pencil of ray from the optical waveguide diverges very small until it reaches the first optical device 99a from the first slant 96a. On the contrary, the second optical device 99b is located on the backside of the substrate 10, separated from the optical waveguide 20 by the thickness of the substrate (about 1 mm). Then, the pencil of ray from the optical waveguide diverges more than the sensing area of the second optical device 99b (normally about 50 μm in diameter) in the traverse across the substrate. Therefore, it is necessary to focus the ray 92 into the sensing area of the second optical device 99b. Focusing optics of the microlens in this embodiment is illustrated in the FIG. 12.

Concatenating the optical module in this embodiment can also produce a bi-directional multi-wavelength optical module with more functions. Further combinations of this embodiment to the other optical modules in this invention is still possible to produce other optical devices in variety.

Various modifications of this invention can be made within the concepts and the range of this invention. Therefore, the explanations of the embodiments according to this invention are provided not for the restriction of the claims or its equivalents but for the illustration only.

The invention claimed is:

1. An optical module, comprising:
   a first and a second optical waveguide approaching each other on the upper side of a substrate;

a third and a fourth optical waveguide approaching each other, having the approaching area which is connected to the first and the second optical waveguide in extension;

a cutout at the approaching area, comprising a first slant for cutting the first and second optical waveguide with a first cutting angle, and a second slant for cutting the third and fourth optical waveguide with a second cutting angle;

a film-filter formed on the approaching area; and an optical device on or under the approaching area.

2. The optical module according to claim 1, wherein the first and third optical waveguide and the second and fourth optical waveguide are substantially symmetric to the projections of the normals of the first and the second slant in the plane of the substrate.

3. The optical module according to claim 1, wherein the first and the second slant are substantially symmetric to the normal of the substrate passing the crossing center of the optical waveguides.

4. The optical module according claim 3, wherein the first and the second slant are coated asymmetrically.

5. The optical module according to claim 1, wherein some wavelengths of the incoming light from the first optical waveguide are transferred to the second optical waveguide reflected by the first slant; and some wavelengths of the incoming light from the third optical waveguide are transferred to the first optical waveguide across the first and second slant.

6. The optical module according to claim 1, wherein the optical device is a surface-emitting laser diode or a surface-sensitive photodiode.

7. The optical module according to claim 1, wherein the cutout is filled with a transparent optical medium or double layer of a transparent optical medium and a light-absorbing medium preventing a stray light.

8. The optical module according to claim 7, wherein the transparent optical medium or the light-absorbing medium is a glass, a polymer, an epoxy, or a polymer or epoxy containing an absorber such as carbon black.

* * * * *